United States Patent [19]

Ueda et al.

[11] Patent Number: 4,925,069
[45] Date of Patent: May 15, 1990

[54] APPARATUS FOR FILLING SPECIFIED AMOUNT OF LIQUID

[75] Inventors: Kazuo Ueda; Shigeru Wakabayashi; Yoshihiro Saijo; Yasuji Fujikawa, all of Tokushima, Japan

[73] Assignee: Shikoku Kakoki Co., Ltd., Tokushima, Japan

[21] Appl. No.: 243,748

[22] Filed: Sep. 13, 1988

[30] Foreign Application Priority Data

Sep. 17, 1987 [JP] Japan .......................... 62-141777[U]
Feb. 23, 1988 [JP] Japan ............................ 63-23573[U]

[51] Int. Cl.⁵ ............................................. B65D 5/72
[52] U.S. Cl. .................................. 222/500; 222/510; 222/517; 222/512; 222/380
[58] Field of Search ............... 222/500, 496, 495, 504, 222/405, 510, 517, 511, 559, 517, 355, 361, 362, 556, 380, 512

[56] References Cited

U.S. PATENT DOCUMENTS

| | | | |
|---|---|---|---|
| 2,475,720 | 7/1949 | Preston | 222/510 |
| 2,636,647 | 4/1953 | Covitt et al. | 222/510 |
| 2,842,294 | 7/1958 | Crowder | 222/510 |
| 4,416,396 | 11/1983 | Ward | 222/510 |

FOREIGN PATENT DOCUMENTS 319119 6/1965 Sweden .......................... 222/510

Primary Examiner—Joseph J. Rolla
Assistant Examiner—Kenneth Noland
Attorney, Agent, or Firm—Armstrong, Nikaido, Marmelstein, Kubovcik Murray

[57] ABSTRACT

An apparatus for filling a specified amount of liquid comprising a metering cylinder having a piston therein, a vertical filling nozzle having an opening at its lower end and forcibly chargeable with a liquid from the metering cylinder by the operation of the piston, a damper for opening and closing the opening of the filling nozzle, a spring biasing the damper so as to hold the damper closed against the gravity acting on the liquid filling the nozzle while the damper is closed with the charging discontinued although permitting the damper to be opened with the pressure of the liquid forcibly charged into the filling nozzle from the metering cylinder, and a closing device adapted to act on the damper in its open state to close the damper when the charging of the liquid is discontinued and adapted to be brought out of action transmitting relation with the damper so as to permit the spring only to hold the damper closed before the charging of the liquid is subsequently started. The closing device includes bumper for mitigating the impact acting on the damper and a damper operating member when the damper is closed.

12 Claims, 3 Drawing Sheets

APPARATUS FOR FILLING SPECIFIED AMOUNT OF LIQUID

BACKGROUND OF THE INVENTION

1. Field of the Invention

The present invention relates to an apparatus for filling containers each with a specified amount of liquid such as flowable food.

2. Description of the Prior Art

Examined Japanese Patent Publication No. 26550/1984, for example, discloses such an apparatus which comprises a tubular nozzle body, a damper attached to the lower end of the nozzle body and movable upward and downward, a spring suspending member fixedly disposed in an upper portion of the nozzle body, a coiled spring suspended from the suspending member, a member connecting the lower end of the spring to the free end of the damper, and a resistance member fixed to the connecting member and positioned below the coiled spring for offering resistance to a liquid flowing down.

When the liquid is forcibly charged into the apparatus, the pressure of the liquid acting on the damper opens the damper against the force of the spring. The liquid pressure acting on the resistance member adds to the damper opening force, opening the damper to a greater extent and consequently permitting the nozzle body to discharge the liquid more rapidly. The rapid flow of the liquid precludes occurrence of air bubbles due to stirring of the liquid to assure a high-speed filling operation.

Despite the above advantage, the conventional apparatus has the following problem.

The spring force, if increased, makes the damper difficult to open, whereas a lower spring force renders the damper difficult to close. It is therefore difficult to adjust the spring force. Especially when the liquid to be filled contains a fibrous substance, fibers become lodged in the pivoted portion of the damper, making the damper no longer openable or closable smoothly.

The above problem may be overcome by forcibly opening and closing the damper with some actuator without resorting to the force of the spring. However, the damper must then be opened simultaneously with the feed of the liquid to the nozzle body, but this is difficult to realize. Further when the damper is quickly closed with the actuator, the resulting impact is likely to cause damage to the portion of the apparatus including the damper.

SUMMARY OF THE INVENTION

The main object of the present invention is to provide an apparatus for filling a specified amount of liquid into containers free of the above problem.

The liquid filling apparatus of the invention comprises a metering cylinder having a piston therein, a vertical filling nozzle having an opening at its lower end and forcibly chargeable with a liquid from the metering cylinder by the operation of the piston, a damper for opening and closing the opening of the filling nozzle, a spring biasing the damper so as to hold the damper closed against the gravity acting on the liquid filling the nozzle while the damper is closed with the charging discontinued although permitting the damper to be opened with the pressure of the liquid forcibly charged into the filling nozzle from the metering cylinder, and closing means adapted to act on the damper in its open state to close the damper when the charging of the liquid is discontinued and adapted to be brought out of action transmitting relation with the damper so as to permit the spring only to hold the damper closed before the charging of the liquid is subsequently started.

The closing means includes a bumper for mitigating the impact acting on the damper and on a damper operating member when the damper is closed.

According to the invention, the closing means cooperates with the spring to close the damper, thus obviating the need to close the damper only with the force of the spring, so that the force of the spring is settable to a minimum magnitude capable of withstanding the gravity acting on the liquid filling the nozzle. Consequently, the damper is openable and closable smoothly. The impact produced when the damper is closed can be mitigated by the bumper.

DESCRIPTION OF THE PREFERRED EMBODIMENT

An apparatus embodying the invention for filling a specified amount of liquid into containers will be described with reference to the drawings.

Figure 1:
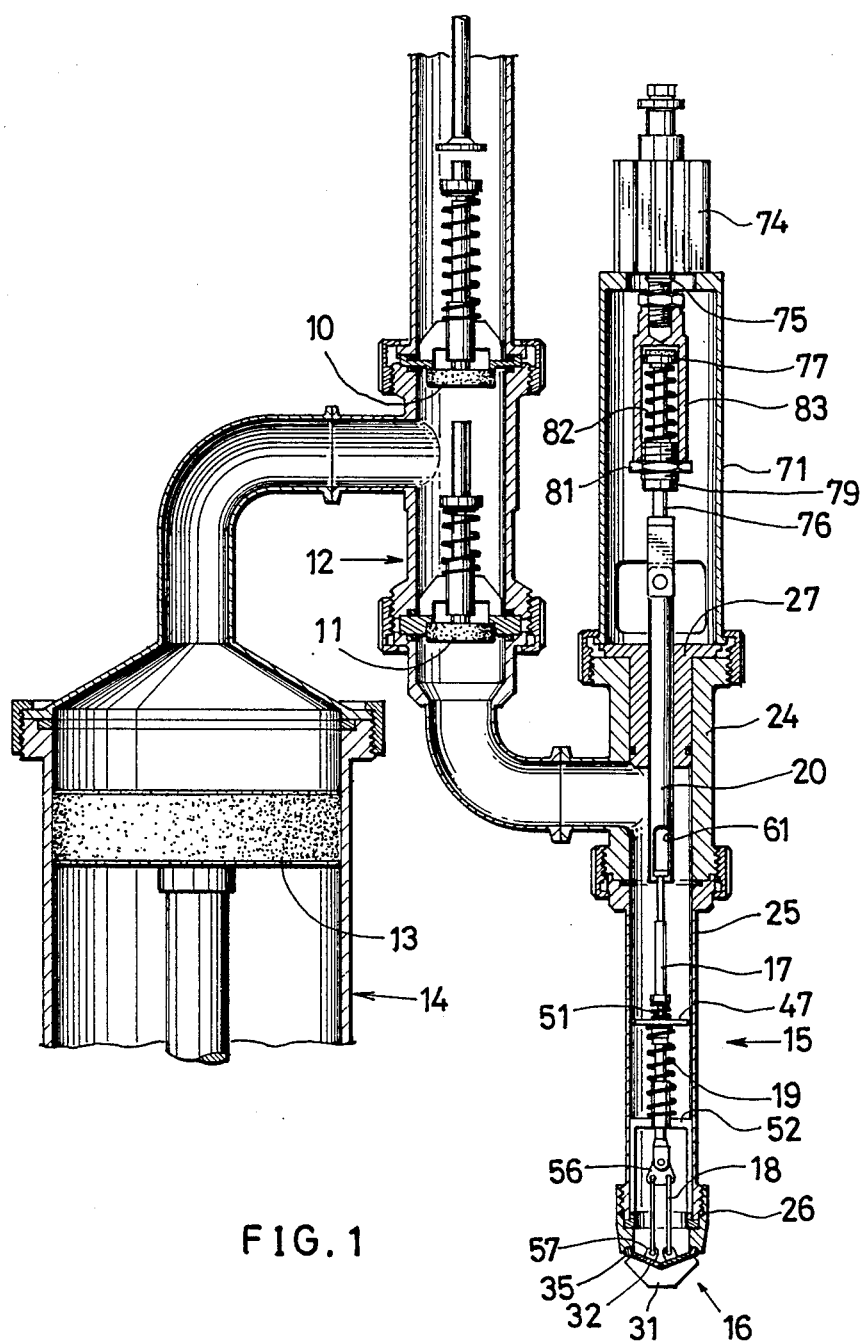
FIG. 1 is a longitudinal view in vertical section showing an embodiment of the invention.

The apparatus shown in FIG. 1 comprises a vertical filling cylinder 12 connected to an unillustrated tank for containing the liquid to be filled and having upper and lower check values 10 and 11, a metering cylinder 14 having a piston 13 therein and connected to the filling cylinder 12 in communication an intermediate portion thereof between the upper and lower check valves 10, 11, a filling nozzle 15 in the form of a vertical tube and connected to the lower end of the filling cylinder 12, a damper 16 attached to the lower end of the filling nozzle 15 and pivotally movable upward and downward, a lower vertical rod 17 supported by a lower portion of the filling nozzle 15 and movable upward and downward, link members 18 connecting the free end of the damper 16 to the lower end of the lower vertical rod 17, a coiled compression spring 19 biasing the lower vertical rod 17 upward, and an upper vertical rod 20 supported by the upper portion of the filling nozzle 15 vertically movably and aligned with the lower vertical rod 17.

The filling cylinder 12 and the metering cylinder 14 are those already known.

The filling nozzle 15 comprises an upper member 24, an intermediate member 25 and a lower member 26. The upper member 24 has a closure 27 covering its upper end. Although not described in detail, the upper member 24 is joined to the intermediate member, and the intermediate member 25 to the lower member 26, each by fastening means. The entire upper and intermediate members 24, 25 and the upper portion of the lower member 26 are generally in the form of a hollow cylinder, but the lower portion of the lower member 26 is in the form of a tube with a square cross section. Of the four sides of the square of the open lower end, two opposed sides are provided with a pair of inverted trapezoidal dependent guide plates 31 opposed to each other.

The damper 16 is in the form of a double-leafed hinged door and comprises a pair of rectangular opening plates 32 provided between the two guide plates 31. Each opening plate 32 is fixedly provided at its base end with a horizontal pin 35, which is rotatably supported at its opposite ends by the opening edge of the lower member 26. When closed, the two opening plates 32 are combined to form a V-shaped cross section.

Figure 2:
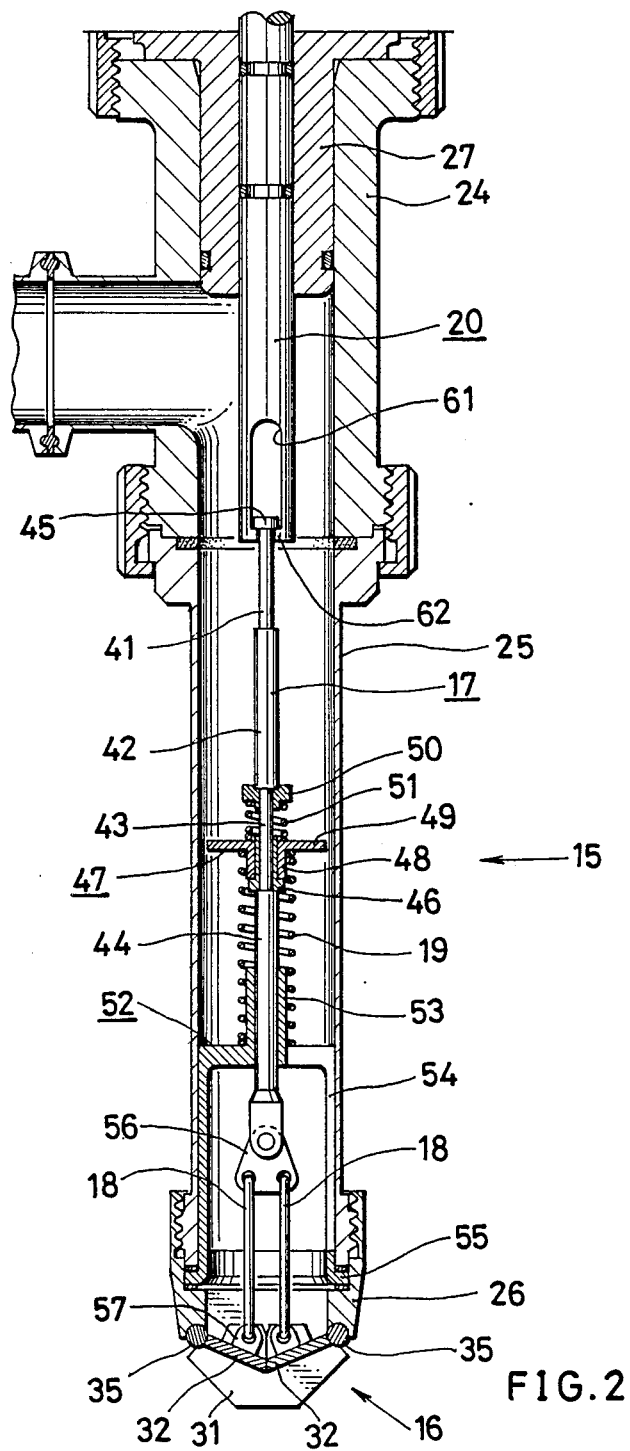
FIG. 2 is a longitudinal view in vertical section showing a portion of FIG. 1 on an enlarged scale.

With reference to FIG. 2, the lower vertical rod 17 comprises an upper small-diameter portion 41, upper large-diameter portion 42, lower small-diameter portion 43 and lower large-diameter portion 44 arranged downward from its upper end and joined to one another at a stepped portion. The upper small-diameter portion 41 has an engaging flange 45 at its upper end. A resistance member 47 is attached to the lower small-diameter portion 43 by a mount member 46. The mount member 46 comprises divided segments joined together in the form of a flanged sleeve fitting around the lower half of the lower small-diameter portion 43 and engaging from above with the stepped portion between the lower small-diameter portion 43 and the lower large-diameter portion 44. The resistance member 47, which offers resistance to the liquid flowing down, comprises a vertical tubular portion 48 fitting around the mount member 46 and engaging with its flange from above, and a horizontal annular portion 49 integral with the upper end of the tubular portion 48. An approximately U-shaped spring retainer 50 is engaged from below with the stepped portion between the upper large-diameter portion 42 and the lower small-diameter portion 43. A coiled compression spring 51 is provided between the spring retainer 50 and the resistance member 47. The spring 51 acts against the damper closing spring 19 for immovably holding the resistance member 47 to the lower vertical rod 17. A guide member 52, which is disposed below the resistance member 47, comprises a tubular portion 53 fitting around the lower large-diameter portion 44 vertically movably, arms 54 radially outwardly extending from the portion 53 in a Y-shaped arrangement when seen from above and inverted L-shaped when seen from one side, and an annular portion 55 interconnecting the lower ends of the arms 54 and held between the intermediate member 25 and the lower member 26. The damper closing spring 19 is held in a compressed state between the annular portion 49 of the resistance member 47 and the arms 54 of the guide member 52.

Each link member 18, which is generally S-shaped slender round rod, has an upper end engaged with a connector 56 pivoted to the lower end of the lower vertical rod 17 and a lower end engaged with an upward lug 57 on the opening plate 32.

The damper closing spring 19 biases the damper 16 so as to hold the damper 16 closed against the gravity acting on the liquid filling the filling nozzle 15 while the damper 16 is closed, with the charging of the liquid into the nozzle 15 from the metering cylinder 14 discontinued, although permitting the damper to be opened with the pressure of the liquid forcibly so charged into the nozzle 15.

The upper vertical rod 20 extends through the closure 27 vertically movably and has an upper end projecting upward beyond the closure 27. The rod 20 has a vertical slit 61 extending upward from its lower end. The slit 61 is longer than the length of vertical stroke of the lower vertical rod 17 for opening and closing the damper 16. The engaging flange 45 is positioned in the slit 61. The rod 20 has at its lower end opposed projections 62 projecting inward from opposite sides of the slit 61 and engaging the flange 45 from below.

Figure 3:
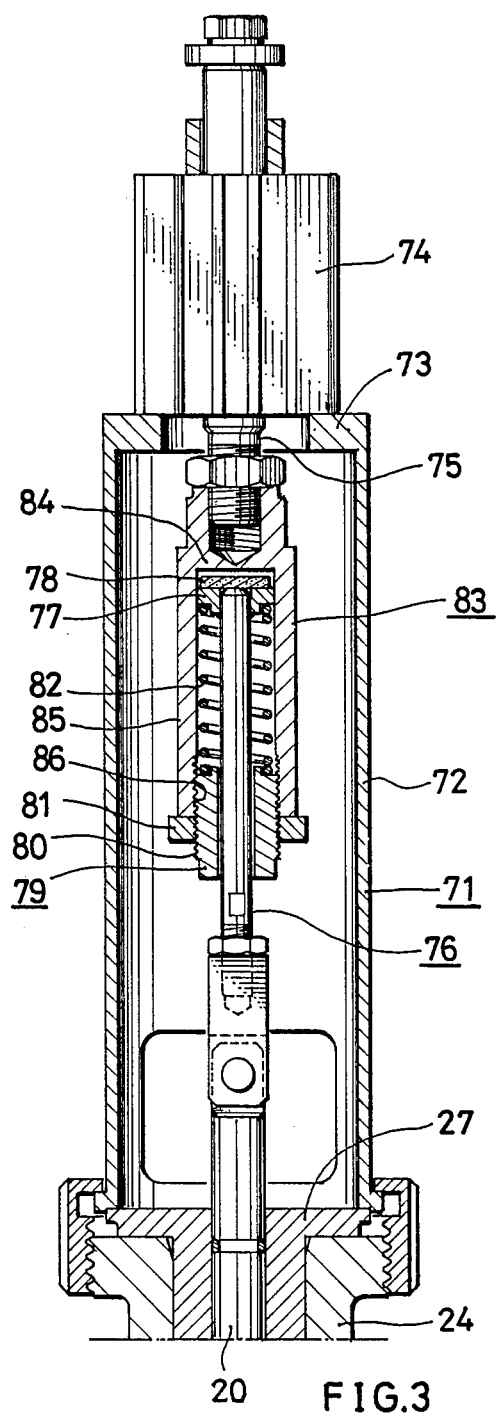
FIG. 3 is a longitudinal view in vertical section showing another portion of FIG. 1 on an enlarged scale.

With reference to FIG. 3, a yoke 71 is attached to the upper end of the filling nozzle 15. The yoke 71 has an approximately semicylindrical trunk wall 72 and a top wall 73. The top wall 73 has attached thereto a hydraulic cylinder 74 directed vertically downward and having a piston rod 75 which extends vertically downward through the top wall 73 into the yoke 71. A lift rod 76 positioned below the piston rod 75 is connected to the upper end of the vertical rod 20. The lift rod 76 is provided with a spring retaining flange 77 at its upper end. A cushioning member 78 of rubber or the like is attached to the upper end of the lift rod 76 in contact with the upper surface of the flange 77. An annular spring retainer 79 is fitted around the lift rod 76 at a portion thereof slightly toward its lower end. The spring retainer 79 has an externally threaded outer periphery 80 having a fastening nut 81 screwed on its lower portion. A coiled compression spring 82 is provided around the lift rod 76 between the retaining flange 77 and the spring retainer 79. The piston rod 75 is connected to the spring retainer 79 by a connecting member 83. The connecting member 83 comprises a top wall 84 and a peripheral wall 85. The top wall 84 is connected to the piston rod 75, and the peripheral wall 85 surrounds the compression spring 82. The peripheral wall 85 has an internally threaded lower end portion 86 having screwed therein the upper portion of the spring retainer 79 which is externally threaded as at 80. The nut 81 is tightened up to connect the piston rod 75 to the spring retainer 79.

FIGS. 1 and 2 show the damper 16 as closed, with the nozzle 15 filled up with the liquid to be filled. In this state, the engaging flange 45 is in engagement with the inward projections 62, with the upper vertical rod 20 in the upper limit position of its vertical stroke. The piston rod 75 of the hydraulic cylinder 74 is retracted, with a clearance formed between the lower surface of the top wall 84 of the connecting member 83 and the upper surface of the cushioning member 78.

Even if the liquid is charged into the filling nozzle 15 from the metering cylinder 14 in this state, the damper 16 can not be opened. Accordingly, before the liquid is charged into the nozzle 15 from the metering cylinder 14, the piston rod 75 of the hydraulic cylinder 74 is advanced to lower the upper vertical rod 20 from the upper limit position to its lower limit position, thereby moving the inward projections 62 out of engagement with the engaging flange 45 to make the lower vertical rod 17 free to move down. When the liquid is then forcibly charged into the nozzle 15 from the metering cylinder 14, the pressure of the liquid opens the damper 16, permitting the liquid to flow out from the nozzle into a container or the like. On completion of the charging or slightly therebefore, the upper vertical rod 20 is lifted, thereby bringing the inward projections 62 into engagement with the engaging flange 45 again during the lift and moving up the lower vertical rod 17 with the rise of the upper rod 20. Consequently, the damper 16 is closed forcibly, whereupon the upper rod 20 stops rising. However, the spring retainer 79 and the connecting member 83 thereafter slightly rises along with the piston rod 75 to slightly compress the spring 82. This means that when the damper 16 is closed, the pressure of the hydraulic cylinder 74 does not act directly on the damper 16, but the force of the spring 82 acts to mitigate the impact exerted on the related parts when the damper 16 is closed. The spring force is adjustable by moving the spring retainer 79 into or out of the connecting member 83.

What is claimed is:

1. An apparatus for filling a specified amount of liquid comprising:
   a metering cylinder having a piston therein;
   a vertical filling nozzle having an upper portion and an opening at a lower end and forcibly chargeable with the liquid from said metering cylinder by operation of the piston;
   a damper having a damper operating member and a free end for opening and closing the opening of the filling nozzle;
   a spring biasing said damper so as to hold said damper closed against the gravity acting on the liquid filling said filling nozzle while said damper is closed with charging into said filling nozzle discontinued although permitting said damper to be opened with the pressure of the liquid forcibly charged into said filling nozzle from said metering cylinder; and
   means connected to said damper for initially closing said damper when the charging into said filling nozzle of the liquid is discontinued and for subsequently releasing hold of the damper thereby allowing only the spring to hold the damper closed before the charging of the liquid is started.

2. An apparatus as defined in claim 1 wherein said means for closing the damper further comprises:
   a bumper for mitigating the impact acting on said damper and on said damper operating member when said damper is closed.

3. An apparatus as defined in claim 2 wherein said damper is pivotally movable upward and downward, and said means for closing said damper further comprises:
   a lower vertical rod having an upper and a lower end supported by the lower portion of said filling nozzle upwardly and downwardly movable, and having a downward engaging portion at its upper end;
   a link member connecting the free end of said damper to the lower end of said lower vertical rod;
   an upper vertical rod having an upper end supported by the upper portion of said filling nozzle upwardly and downwardly movable and aligned with the lower vertical rod, the upper vertical rod having at its lower end an upward engaging portion engageable with the downward engaging portion from below; and
   a hydraulic cylinder mounted on the upper portion of said filling nozzle and directed downward, said hydraulic cylinder having a piston rod connected to the upper end of said upper vertical rod with said bumper provided there between.

4. An apparatus for filling a specified amount of liquid comprising:
   a metering cylinder having a piston therein,
   a vertical filling nozzle forcibly chargeable with the liquid from the metering cylinder by the operation of the piston,
   a damper attached to the lower end of the filling nozzle and pivotally movable upward and downward,
   a lower vertical rod supported by the lower portion of the filling nozzle upwardly and downwardly movably and having an downward engaging portion at its upper end,
   a link member connecting the free end of the damper to the lower end of the lower vertical rod,
   a damper closing spring biasing the lower vertical rod upward so as to hold the damper closed against the gravity acting on the liquid filling the nozzle while the damper is closed with the charging discontinued, although permitting the damper to be opened with the pressure of the liquid forcibly charged into the filling nozzle from the metering cylinder,
   an upper vertical rod supported by the upper portion of the filling nozzle upwardly and downwardly movably and aligned with the lower vertical rod, the upper vertical rod having at its lower end an upward engaging portion engageable with the downward engaging portion from below, and
   lift means for moving the upper vertical rod upward and downward between an upper limit position where the upper vertical rod is located when the damper is closed with the upward engaging portion in engagement with the downward engaging portion and a position lower than the upper limit position at least by the length of vertical stroke of the lower vertical rod for opening and closing the damper.

5. An apparatus as defined in claim 4 wherein the lift means includes a bumper for mitigating the impact acting on the damper, the lower vertical rod, the link member and the upper vertical rod when the damper is closed.

6. An apparatus as defined in claim 4 wherein the upper end of the filling nozzle is covered with a closure, and the upper end of the upper vertical rod extends through the closure vertically movably to project thereabove, the lift means comprising:
   a hydraulic cylinder provided above the upper vertical rod and attached to the upper end of the filling nozzle by a yoke, the hydraulic cylinder having a piston rod directed vertically downward,
   a lift rod positioned below the piston rod and connected to the upper end of the upper vertical rod, the lift rod having a flange at its upper end,
   an annular spring retainer fitted around the lift rod and movable upward and downward,
   a shock-absorbing coiled compression spring provided around the lift rod and interposed between the flange and the spring retainer, and
   a connecting member connecting the piston rod to the spring retainer.

7. An apparatus as defined in claim 6 wherein the connecting member comprises a top wall and a peripheral wall, the top wall being connected to the piston rod, the peripheral wall surrounding the coiled compression spring and being internally threaded at its lower end, the spring retainer being externally threaded and having its threaded upper portion screwed in the internally threaded lower end of the wall, a fastening nut being screwed on the externally threaded lower portion of the spring retainer.

8. An apparatus as defined in claim 4 wherein the lower vertical rod is formed at its upper end with a flange serving as the downward engaging portion, and the upper vertical rod is formed with a vertical slit extending upward from its lower end over a distance longer than the length of vertical stroke of the lower vertical rod, the upper vertical rod being formed at its lower end with opposed projections projecting inward from opposite sides of the slit to engage from below the flange as positioned in the slit and providing the upward engaging portion.

9. An apparatus as defined in claim 4 wherein a resistance member against the downward flow of the liquid is attached to a lengthwise intermediate portion of the lower vertical rod.

10. An apparatus as defined in claim 9 wherein a guide member positioned below the resistance member is secured to the filling nozzle, and the guide member comprises a tubular portion slidably fitted around a larger-diameter portion of the lower vertical rod and arms radially outwardly extending from the tubular portion in a Y-shaped arrangement when seen from above, the damper closing spring being held in a compressed state between the resistance member and the guide member arms.

11. An apparatus for filling a specified amount of liquid comprising:
   a metering cylinder having a piston therein,
   a vertical filling nozzle covered with a closure at its upper end and forcibly chargeable with the liquid from the metering cylinder by the operation of the piston,
   a damper attached to the lower end of the filling nozzle and pivotally movable upward and downward,
   a lower vertical rod supported by the lower portion of the filling nozzle upwardly and downwardly movably and having an engaging flange at its upper end,
   a link member connecting the free end of the damper to the lower end of the lower vertical rod,
   a damper closing spring biasing the lower vertical rod upward so as to hold the damper closed against the gravity acting on the liquid filling the nozzle while the damper is closed with the charging discontinued although permitting the damper to be opened with the pressure of the liquid forcibly charged into the filling nozzle from the metering cylinder,
   an upper vertical rod supported by the upper portion of the filling nozzle upwardly and downwardly movably and aligned with the lower vertical rod, the upper vertical rod having an upper portion extending through the closure vertically movably to project thereabove, the upper vertical rod being formed with a vertical slit extending upward from its lower end over a distance longer than the length of damper opening-closing vertical stroke of the lower vertical rod, the upper vertical rod being formed at its lower end with opposed projections projecting inward from opposite sides of the slit to engage from below the engaging flange as positioned in the slit,
   a hydraulic cylinder provided above the upper vertical rod and attached to the upper end of the filling nozzle by a yoke, the hydraulic cylinder having a piston rod directed vertically downward,
   a lift rod positioned below the piston rod and connected to the upper end of the upper vertical rod, the lift rod having a spring retaining flange at its upper end,
   an annular spring retainer fitted around the lift rod upwardly and downwardly movably and having a threaded outer periphery,
   a shock-absorbing coiled compression spring fitted around the lift rod and provided between the spring retaining flange and the spring retainer,
   a connecting member comprising a top wall having the piston rod connected thereto and a peripheral wall surrounding the coiled compression spring and internally threaded at its lower end, the threaded upper portion of the spring retainer being screwed in the threaded lower end, and
   a fastening nut screwed on the threaded lower portion of the spring retainer.

12. An apparatus for filling a specified amount of liquid comprising:
   a metering cylinder having a piston therein,
   a filling nozzle covered with a closure at its upper end and forcibly chargeable with the liquid from the metering cylinder by the operation of the piston,
   a damper attached to the lower end of the filling nozzle and pivotally movable upward and downward,
   a lower vertical rod supported by the lower portion of the filling nozzle upwardly and downwardly movably and having a downward engaging portion at its upper end,
   a link member connecting the free end of the damper to the lower end of the lower vertical rod,
   an upper vertical rod supported by the upper portion of the filling nozzle upwardly and downwardly movably and aligned with the lower vertical rod, the upper vertical rod having an upper portion extending through the closure vertically movably to project thereabove, the upper vertical rod having at its lower end an upward engaging portion engageable with the downward engaging portion from below,
   lift means for moving the upper vertical rod upward and downward between an upper limit position where the upper vertical rod is located when the damper is closed with the upward engaging portion in engagement with the downward engaging portion and a position lower than the upper limit position at least by the length of damper opening-closing vertical stroke of the lower vertical rod,
   a resistance member attached to a lengthwise intermediate portion of the lower vertical rod to act against the downward flow of the liquid,
   a guide member comprising a tubular portion fitted around the lower vertical rod vertically movably at a position below the resistance member and arms extending radially outward from the tubular portion and secured to the filling nozzle in a Y-shaped arrangement when seen from above, and
   a damper closing coiled compression spring provided between the resistance member and the guide member arms and biasing the lower vertical rod upward so as to hold the damper closed against the gravity acting on the liquid filling the nozzle while the damper is closed with the charging discontinued although permitting the damper to be opened with the pressure of the liquid forcibly charged into the filling nozzle from the metering cylinder.

* * * * *